(12) United States Patent
Shibata (10) Patent No.: US 10,434,929 B2
(45) Date of Patent: Oct. 8, 2019

(54) VEHICLE LAMP CONTROL DEVICE AND VEHICLE LAMP SYSTEM

(71) Applicant: Koito Manufacturing Co., Ltd., Tokyo (JP)

(72) Inventor: Yoshinori Shibata, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/163,802

(22) Filed: Oct. 18, 2018

(65) Prior Publication Data

US 2019/0143883 A1 May 16, 2019

(30) Foreign Application Priority Data

Oct. 24, 2017 (JP) .................................. 2017-205095

(51) Int. Cl.

| B60Q 1/14 | (2006.01) |
|---|---|
| F21S 41/663 | (2018.01) |
| H05B 33/08 | (2006.01) |
| B60Q 1/20 | (2006.01) |
| B60Q 1/08 | (2006.01) |
| B60Q 1/18 | (2006.01) |

(52) U.S. Cl.
CPC ............ B60Q 1/143 (2013.01); B60Q 1/085 (2013.01); B60Q 1/18 (2013.01); B60Q 1/20 (2013.01); F21S 41/663 (2018.01); H05B 33/0854 (2013.01); B60Q 2300/312 (2013.01)

(58) Field of Classification Search
None
See application file for complete search history.

(56) References Cited

U.S. PATENT DOCUMENTS

| 6,254,259 B1 * | 7/2001 | Kobayashi ............. B60Q 1/085 340/459 |
|---|---|---|
| 9,449,518 B2 * | 9/2016 | Mochizuki ............. G08G 1/165 |
| 9,776,567 B2 * | 10/2017 | Mochizuki ............. B60R 1/001 |
| 9,865,103 B2 * | 1/2018 | Kraeling ............... G07C 5/0866 |
| 10,031,214 B2 * | 7/2018 | Rosenzweig ........... G01S 7/497 |
| 2007/0242470 A1 * | 10/2007 | Michiyama ............ B60Q 1/085 362/464 |

FOREIGN PATENT DOCUMENTS

| JP | 2008-094127 A | 4/2008 |
|---|---|---|
| JP | 2012-227102 A | 11/2012 |
| JP | 2015-064964 A | 4/2015 |

* cited by examiner

Primary Examiner — Crystal L Hammond
(74) Attorney, Agent, or Firm — Abelman, Frayne & Schwab (57) ABSTRACT

A vehicle lamp control device includes an information acquisition unit that acquires snowfall information, and a controller that controls a vehicle lamp capable of changing a formation position of a light distribution pattern. The controller controls the vehicle lamp so as to lower the formation position from a predetermined reference position when snowfall is perceived, and when the snowfall amount is larger than a predetermined value, the controller substantially lowers the formation position as compared with the formation position when the snowfall amount is smaller than the predetermined value.

6 Claims, 7 Drawing Sheets

VEHICLE LAMP CONTROL DEVICE AND VEHICLE LAMP SYSTEM

CROSS-REFERENCE TO RELATED APPLICATIONS

This application is based on and claims priority from Japanese Patent Application No. 2017-205095, filed on Oct. 24, 2017 with the Japan Patent Office, the disclosure of which is incorporated herein in its entirety by reference.

TECHNICAL FIELD

The present disclosure relates to a vehicle lamp control device and a vehicle lamp system, and particularly, to a vehicle lamp control device and a vehicle lamp system used in an automobile or the like.

BACKGROUND

A vehicle lamp may improve the visibility of a driver by irradiating light to the front side of a vehicle so as to form a predetermined light distribution pattern. With respect to such a vehicle lamp, in the related art, an adaptive driving beam (ADB) control has been proposed that forms a light distribution pattern according to the position of a vehicle or the like that is present in front of an own vehicle (see, e.g., Japanese Patent Laid-Open Publication Nos. 2015-064964, 2012-227102, and 2008-094127).

SUMMARY

According to the ADB control described above, the visibility of a driver of an own vehicle may be improved while avoiding a glare to, for example, an oncoming vehicle. By improving the visibility, the driver may recognize obstacles in the front side more surely, thereby driving safety is improved. Meanwhile, there is always a demand to improve the driving safety.

The present disclosure has been made in consideration of the circumferences, and is to provide a technology of improving driving safety.

In order to solve the above-described problem, an aspect of the present disclosure provides a vehicle lamp control device. The control device includes an information acquisition unit that acquires snowfall information; and a controller that controls the vehicle lamp capable of changing a formation position of a light distribution pattern, The controller controls the vehicle lamp so as to lower the formation position of the light distribution pattern from a predetermined reference position when snowfall is perceived, and when the snowfall amount is larger than a predetermined value, the controller substantially lowers the formation position as compared with the formation position when the snowfall amount is smaller than the predetermined value. According to this aspect, the driving safety may be improved.

In the aspect described above, when a vehicle speed of an own vehicle is faster than a predetermined value, the controller may substantially lower the formation position of the light distribution pattern as compared with the formation position when the vehicle speed of the own vehicle is slower than the predetermined value. According to this aspect, the driving safety may be improved further.

Another aspect of the present disclosure also provides a vehicle lamp control device. The control device includes an information acquisition unit that acquires snowfall information; and a controller that controls the vehicle lamp capable of changing a formation position of a light distribution pattern. The controller controls the vehicle lamp so as to lower the formation position of the light distribution pattern from a predetermined reference position when snowfall is perceived, and when the vehicle speed of an own vehicle is faster than a predetermined value, the controller substantially lowers the formation position as compared with the formation position when the vehicle speed of the own vehicle is slower than the predetermined position. According to this aspect as well, the driving safety may be improved.

Yet another aspect of the present disclosure is a vehicle lamp system. The vehicle lamp system includes a vehicle lamp capable of changing a formation position of a light distribution pattern, a snowfall detection device, and the vehicle lamp control device according to one of the above-described aspects.

According to the present disclosure, the driving safety may be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Hereinafter, embodiments of the present disclosure will be described with reference to the drawings. The embodiments are not intended to limit the present disclosure thereto, but are merely exemplary. All features described in the embodiment or combinations thereof may not be essential for the present disclosure. Identical or corresponding components, members, and processes in each of the drawings will be denoted by the same symbols, and overlapping descriptions thereof will be appropriately omitted. In addition, a scale or a shape of each component illustrated in each of the drawings is conveniently set in order to facilitate descriptions thereof and should not be construed as being limited. In addition, unless otherwise mentioned, for example, the terms "first" and "second" used herein or in the claims are not intended to refer to any order or importance but are intended to discriminate a component from another component.

(First Embodiment)

Figure 1:
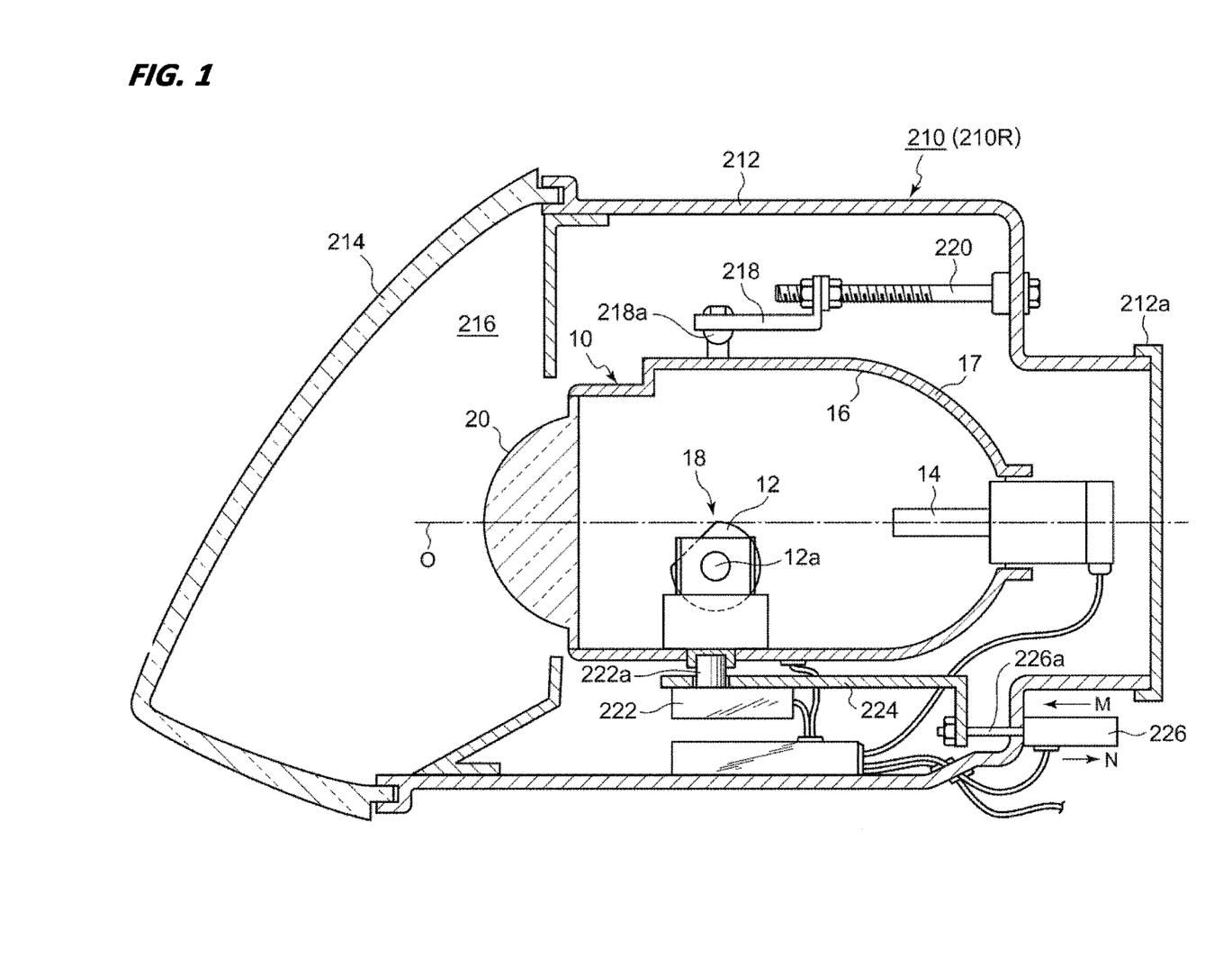
FIG. 1 is a schematic vertical cross-sectional view illustrating a headlamp unit including a vehicle lamp which is a target of a control device according to each embodiment.

FIG. 1 is a schematic cross-sectional view illustrating a structure of a headlamp device including a vehicle lamp according to a first embodiment. A headlamp unit 210 has a configuration in which a pair of headlamp units formed symmetrically with respect to each other are respectively arranged on each side in a vehicle width direction of a vehicle. A right-side headlamp unit 210R and a left-side headlamp unit 210L have substantially the same configuration. Thus, the structure of the right-side headlamp unit 210R will be described in the following.

The headlamp unit 210R includes a lamp body 212 having an opening on a front side of the vehicle, and a light-transmitting cover 214 which covers the opening. The lamp body 212 includes a detachable cover 212a on a rear side of the vehicle. A lamp chamber 216 is formed by the lamp body 212 and the light-transmitting cover 214. A lamp unit 10 serving as a vehicle lamp is accommodated within the lamp chamber 216.

A lamp bracket 218 is connected to the lamp unit 10. The lamp bracket 218 includes a pivot mechanism 218a which serves as a swinging center in a vertical direction and horizontal direction of the lamp unit 10. In addition, the lamp bracket 218 is screwed with an aiming adjustment screw 220 supported by the lamp body 212. A rotation shaft 222a of a swivel actuator 222 is fixed to a lower surface of the lamp unit 10. The swivel actuator 222 is fixed to a unit bracket 224.

A leveling actuator 226 is connected to the unit bracket 224. The leveling actuator 226 is constituted by, for example, a motor that extends and retracts a rod 226a in directions of arrows M and N. For example, a DC motor is used as the motor that constitutes the leveling actuator 226. The lamp unit 10 is in a rearwardly inclined posture and a forwardly inclined posture by expanding and retracting the rod 226a in the directions of the arrows M and N. Therefore, a leveling adjustment may be performed so that a pitch angle of an optical axis O is directed downward or upward.

The lamp unit 10 is provided with a shade mechanism 18 including a rotation shade 12, a light source 14, a lamp housing 17 that supports a reflector 16 on an inner wall, and a projection lens 20. A semiconductor light emitting element such as, for example, a light emitting diode (LED), a laser diode (LD), and electroluminescence (EL) element, an electric bulb, an incandescent lamp, a halogen lamp, a discharge lamp, or the like may be used as the light source 14. The reflector 16 has an oval spherical shape at least a portion thereof, and reflects the light emitted from the light source 14.

A portion of the light from the light source 14 and the light reflected by the reflector 16 are introduced into the projection lens 20 via the rotation shade 12. The rotation shade 12 is a cylindrical member capable of rotating around the rotation shaft 12a, and provided with a notch and a plurality of shade plates (not illustrated). Any one of the notch or the shade plates is moved on the optical axis O to form a predetermined light distribution pattern. The projection lens 20 is formed with a plano-convex aspheric lens, and projects the light source image formed on a rear focal plane as a reversed image onto a virtual vertical screen in front of the lamp. In the lamp unit 10, the formation position of the light distribution pattern may be changed by driving the swivel actuator 222 and/or the leveling actuator 226.

The structure of the lamp unit 10 is not limited to the above-described structure. For example, the structure may be provided with a shutter type shade, or a reflection type lamp unit that does not have the projection lens 20. Further, the lamp unit 10 may be configured with, for example, a digital mirror device (DMD), a scanning optical system that scans the front of the own vehicle with the light of the light source 14, and an LED array in which the LEDs serving as the light source 14 are arranged at predetermined positions.

Figure 2:
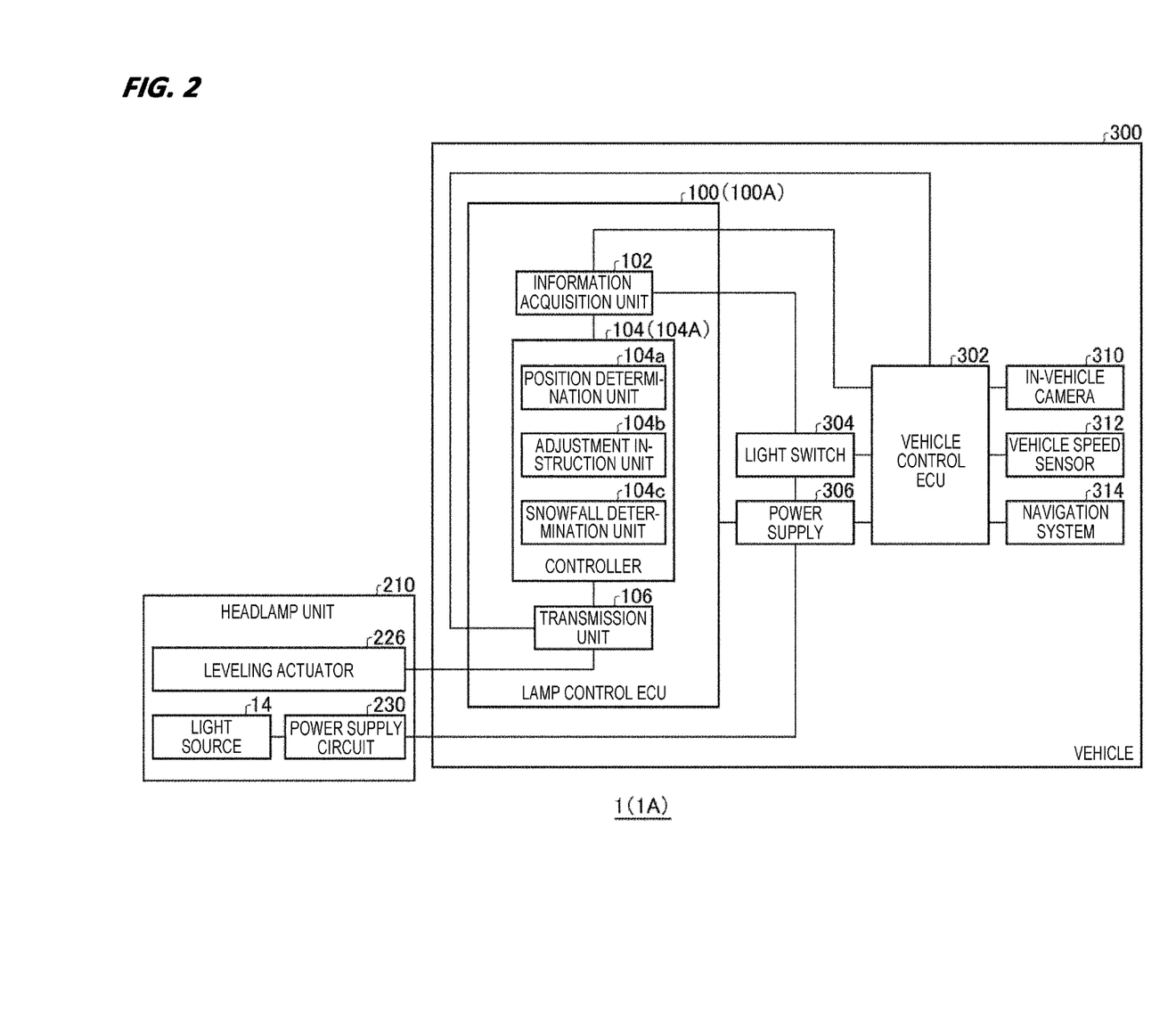
FIG. 2 is a view illustrating a schematic configuration of a vehicle lamp system according to a first embodiment.

FIG. 2 is a view illustrating a schematic configuration of a vehicle lamp system according to the first embodiment. In FIG. 2, the headlamp unit 210R and the headlamp unit 210L are collectively referred to as a "headlamp unit 210." Further, components of the vehicle lamp system are depicted as functional blocks. These functional blocks are implemented by elements or circuits including a CPU or a memory of a computer as a hardware configuration, and by, for example, a computer program as a software configuration. Those skilled in the art would understand that these functional blocks may be implemented in various ways, for example, by a combination of hardware and software.

A vehicle lamp system 1(1A) includes the headlamp unit 210 that includes the lamp unit 10 serving as a vehicle lamp, a lamp control ECU 100 (100A) serving as a control device for the vehicle lamp, an in-vehicle camera 310 and a navigation system 314 serving as a snowfall detection device, a vehicle control ECU 302, a light switch 304, a power supply 306, and a vehicle speed sensor 312 as main components.

The lamp control ECU 100 includes an information acquisition unit 102, controller 104 (104A), and a transmission unit 106. The lamp control ECU 100 is provided in, for example, a vehicle 300. An installation position of the lamp control ECU 100 is not particularly limited. For example, the lamp control ECU 100 may be provided in the headlamp unit 210. The lamp control ECU 100 is connected with, for example, the vehicle control ECU 302 and the light switch 304. Signals output from, for example, the vehicle control ECU 302 and the light switch 304 are received by the information acquisition unit 102.

The vehicle control ECU 302 is connected with, for example, the in-vehicle camera 310, the vehicle speed sensor 312, and the navigation system 314. The in-vehicle camera 310 is a camera that captures an image of the front of the own vehicle. Signals output from these devices are received by the information acquisition unit 102 in the lamp control ECU 100 via the vehicle control ECU 302.

The light switch 304 transmits, in accordance with operation contents of a driver, a signal for instructing turning ON/OFF of the headlamp unit 210, a signal for instructing a leveling control described later, or the like to the power supply 306, the vehicle control ECU 302, and the lamp control ECU 100.

The signal received by the information acquisition unit 102 is transmitted to the controller 104. The controller 104 executes the leveling control that displaces the posture of the lamp unit 10. The controller 104 includes a position determination unit 104a, an adjustment instruction unit 104b, and a snowfall determination unit 104c. Operations of respective units included in the controller 104 will be described later in detail.

The power supply 306 that supplies electric power to the lamp control ECU 100, the vehicle control ECU 302, and the headlamp unit 210 is mounted on the vehicle 300. When turning ON of the headlamp unit 210 is instructed by the operation of the light switch 304, the electric power is supplied from the power supply 306 to the light source 14 via a power supply circuit 230.

(Leveling Control in accordance with Snowfall)

Figure 3A:
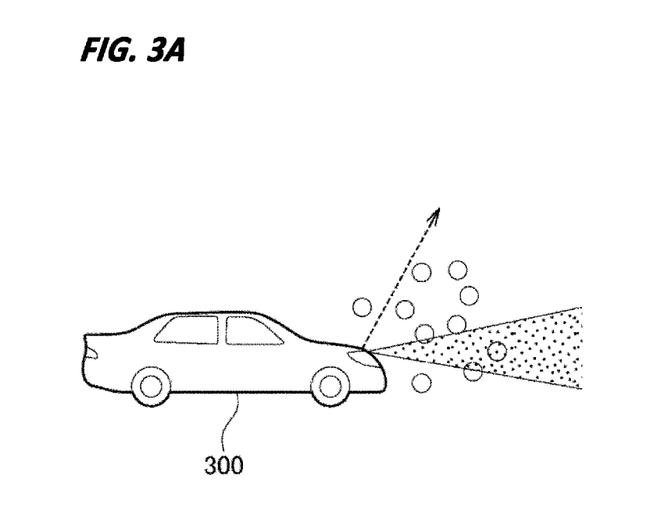
FIG. 3A is a schematic view illustrating an appearance of light irradiated from the headlamp unit during a snowfall.
Figure 3B:
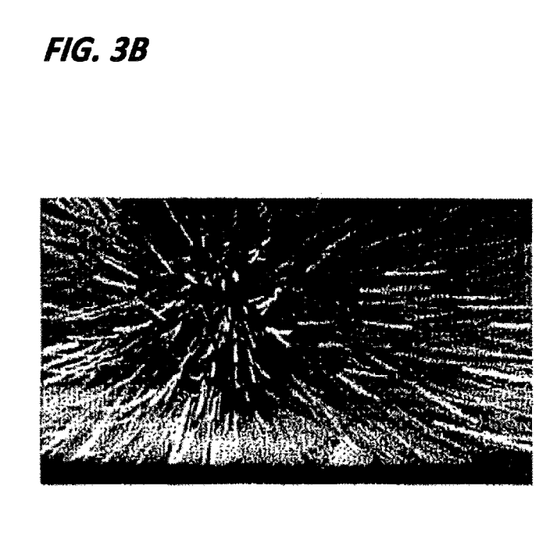
FIG. 3B is a view illustrating a state visible from a driver in the situation illustrated in FIG. 3A.
Figure 4A:
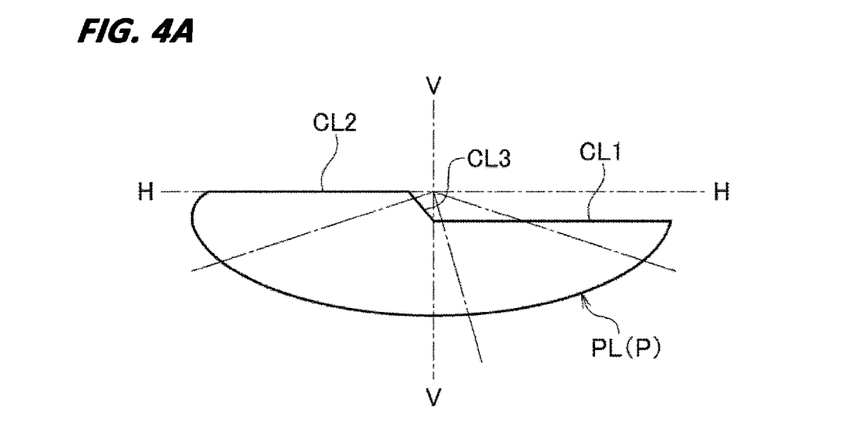
FIG. 4A is a schematic view illustrating a light distribution pattern formed on a reference position.
Figure 4B:
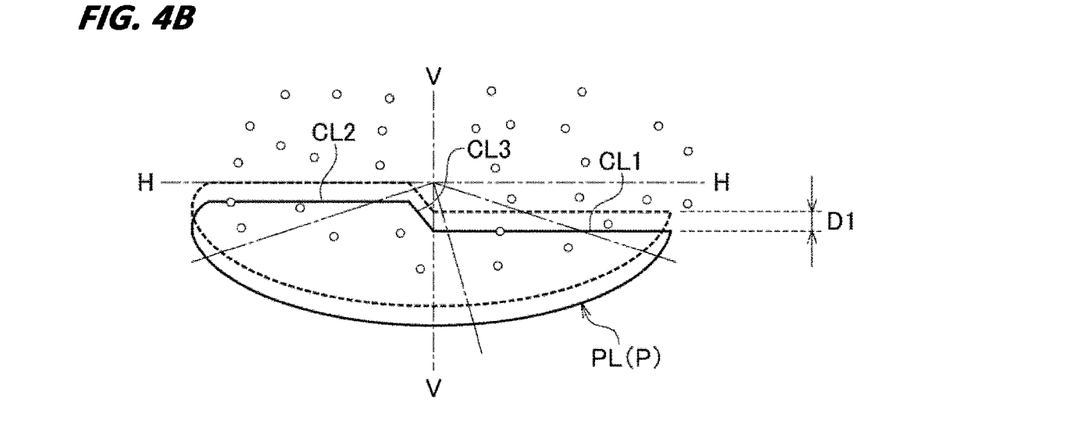
FIG. 4B is a schematic view illustrating a light distribution pattern formed on a predetermined first position.
Figure 4C:
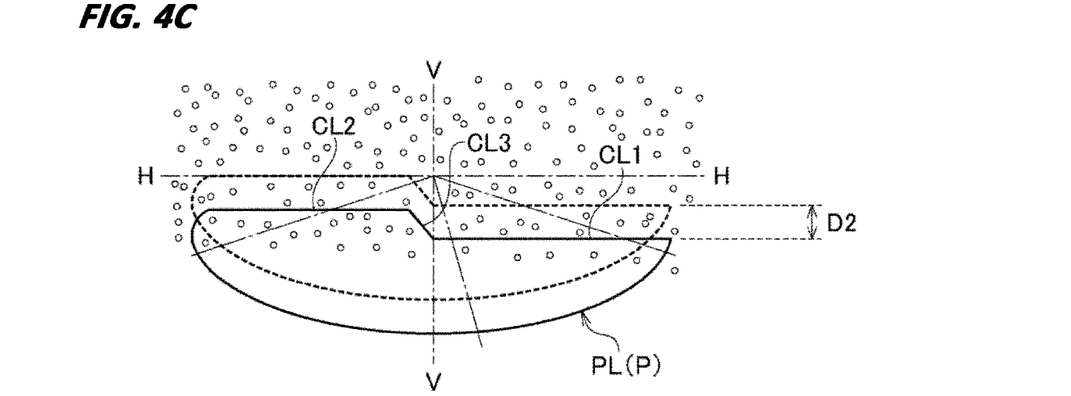
FIG. 4C is a schematic view illustrating a light distribution pattern formed on a predetermined second position.

Consequently, the leveling control by the lamp control ECU 100 provided with the above-described components will be described in detail. FIG. 3A is a schematic view illustrating an appearance of the light irradiated from the headlamp unit during a snowfall. FIG. 3B is a view illustrating a state visible from a driver in the situation illustrated in FIG. 3A. FIG. 4A is a schematic view illustrating a light distribution pattern formed on a reference position. FIG. 4B is a schematic view illustrating a light distribution pattern formed on a predetermined first position. FIG. 4C is a schematic view illustrating a light distribution pattern formed on a predetermined second position. Snow is indicated by a circular symbol (0) in FIGS. 3A, 4B, and 4C.

Normally, most of the light irradiated from the headlamp unit 210 is used to form a light distribution pattern. However, a portion of the light is reflected to the own vehicle by the snow. Particularly, as indicated by the broken line arrow in FIG. 3A, a portion of the light is a leaking light which does not contribute to the formation of the light distribution pattern, and is irradiated upwardly. Such leaking light is likely to be reflected to the own vehicle by the snow. Therefore, as illustrated in FIG. 3B, the driver visually recognizes the points or lines of high luminance in the entire field of view, and the visibility is impaired.

In this regard, the controller 104 executes the leveling control that displaces the posture of the lamp unit 10 according to the snowfall. Specifically, the controller 104 controls the lamp unit 10 so as to lower the formation position of the light distribution pattern from a predetermined reference position when snowfall is perceived. When the snowfall amount is relatively large (e.g., larger than a predetermined amount), the controller 104 substantially lowers the formation position of the light distribution pattern as compared with the formation position when the snowfall amount is relatively small (e.g., smaller than the predetermined amount).

The controller 104 determines the presence of snowfall as well as the snowfall amount by the snowfall determination unit 104c, determines the formation position of the light distribution pattern by the position determination unit 104a, and determines the pitch angle to be taken by the lamp unit 10 by the adjustment instruction unit 104b so as to drive the leveling actuator 226. Detailed descriptions will be provided in the below.

The snowfall determination unit 104c determines the presence of snowfall and the snowfall amount in a running environment of the own vehicle based on the snowfall information obtained from the snowfall detection device. As a snowfall detection device, the in-vehicle camera 310 or the navigation system 314 may be used. A signal indicating a detection result of the snowfall detection device, that is, a signal indicating the snowfall information is acquired by the information acquisition unit 102 and transmitted to the controller 104.

When the in-vehicle camera 310 captures an image of the front of the own vehicle in a situation where it is snowing, points or lines of high luminance caused by the snow appear in the obtained image. Therefore, when the in-vehicle camera 310 is used as the snowfall detection device, the snowfall determination unit 104c may determine the presence of snowfall and the snowfall amount from the gradation distribution of the luminance in the image data acquired from the in-vehicle camera 310. Further, when the navigation system 314 is used as the snowfall detection device, the snowfall determination unit 104c may determine the presence of snowfall and the snowfall amount from the weather information acquired from the outside by the navigation system 314.

For example, the snowfall determination unit 104c has a predetermined first threshold value regarding the snowfall amount. When the snowfall amount is smaller than the first threshold value, the snowfall amount is defined as a predetermined first amount. Further, when the snowfall amount is equal to or larger than the first threshold value, the snowfall amount is defined as a predetermined second amount. The snowfall determination unit 104c may determine the presence of the snowfall in the same manner, based on a predetermined second threshold value. That is, the snowfall determination unit 104c determines that there is no snowfall when the snowfall amount is smaller than the second threshold value, and determines that there is snowfall when the snowfall amount is equal to or larger than the second threshold value. An indication that "There is no snowfall" may include situations not only where snow is not falling, but also where snow is falling to the extent that the snow does not give glare to the driver. The first threshold value and the second threshold value may be properly set based on experiments and simulations by a system designer. A signal indicating the determination result of the snowfall determination unit 104c, that is, a signal indicating the presence of snowfall and the snowfall amount is sent to the position determination unit 104a.

The position determination unit 104a determines a position where a light distribution pattern P should be formed by using the information acquired from the snowfall determination unit 104c. First, in a situation where it is not snowing, the position determination unit 104a determines the formation position of the light distribution pattern P as a predetermined reference position as illustrated in FIG. 4A. In FIGS. 4A to 4C, a low-beam light distribution pattern P1 used in a region where the traffic regulations specify to keep the left is illustrated as an example of the light distribution pattern P.

The low-beam light distribution pattern PL has cutoff lines CL1, CL2, and CL3 which are different in level at the left side and the right side on an upper edge. The cutoff line CL1 is formed as a cutoff line of an oncoming lane side on the right side from a V-V line of the lamp unit 10 so as to extend in a horizontal direction. The cutoff line CL2 is formed as a cutoff line of an own vehicle lane side on the left side from the V-V line so as to extend in a horizontal direction at a higher position than the cutoff lien CL1. The cutoff lien CL3 is formed as an inclined cutoff line that connects an end of the cutoff line CL2 at the V-V line side and an end of the cutoff line CL1 at the V-V line side.

When the low-beam light distribution pattern PL is formed at the predetermined reference position, the cutoff line CL2 coincides with the H-H line of the lamp unit 10. A reference position of the low-beam light distribution pattern PL and other light distribution patterns may be properly set by those skilled in the art according to, for example, traffic regulations.

Further, in a situation where it is snowing, the position determination unit 104a lowers the formation position of the light distribution pattern P from the reference position as illustrated in FIGS. 4B and 4C. In addition, as illustrated in FIG. 4B, when the snowfall amount is the predetermined first amount, the position determination unit 104a sets the formation position of the light distribution pattern P at a first position which is lowered from the reference position by a predetermined first lowering amount D1.

In the meantime, as illustrated in FIG. 4C, when the snowfall amount is the predetermined second amount which is larger than the first amount, the position determination unit 104a sets the formation position of the light distribution pattern P at a second position which is lowered from the reference position by a predetermined second lowering amount D2 which is larger than the first lowering amount D1. That is, the position determination unit 104a displaces the position of a geometric center of gravity of the light distribution pattern P further downwardly as the snowfall amount increases. In the case of the low-beam light distribution pattern PL, the positions of the cutoff lines CL1 to CL3 are displaced downwardly.

For example, the position determination unit 104a stores in a memory a conversion table in which the snowfall amount and the formation position of the light distribution pattern P are associated with each other in advance. Then, by using the conversion table, the formation position of the light distribution pattern P is set from the determination result of the snowfall determination unit 104c.

The adjustment instruction unit 104b sets the pitch angle to be taken by the lamp unit 10 based on the formation position of the light distribution pattern P set by the position determination unit 104a. For example, the adjustment instruction unit 104b stores in a memory a conversion table in which the formation position of the light distribution pattern P and the pitch angle of the lamp unit 10 are associated with each other in advance. Then, by using the conversion table, the pitch angle of the lamp unit 10 is set from the determination result of the position determination unit 104a.

The adjustment instruction unit 104b generates an adjustment signal that instructs to adjust the pitch angle of the lamp unit 10, and outputs the signal to the leveling actuator 226 via the transmission unit 106. The leveling actuator 226 is driven based on the received adjustment signal. Therefore, the pitch angle of the lamp unit 10 is adjusted. That is, in the present embodiment, the formation position of the light distribution pattern P is lowered by lowering the optical axis of the lamp unit 10 while keeping the same type of the light distribution pattern P to be formed.

Figure 5:
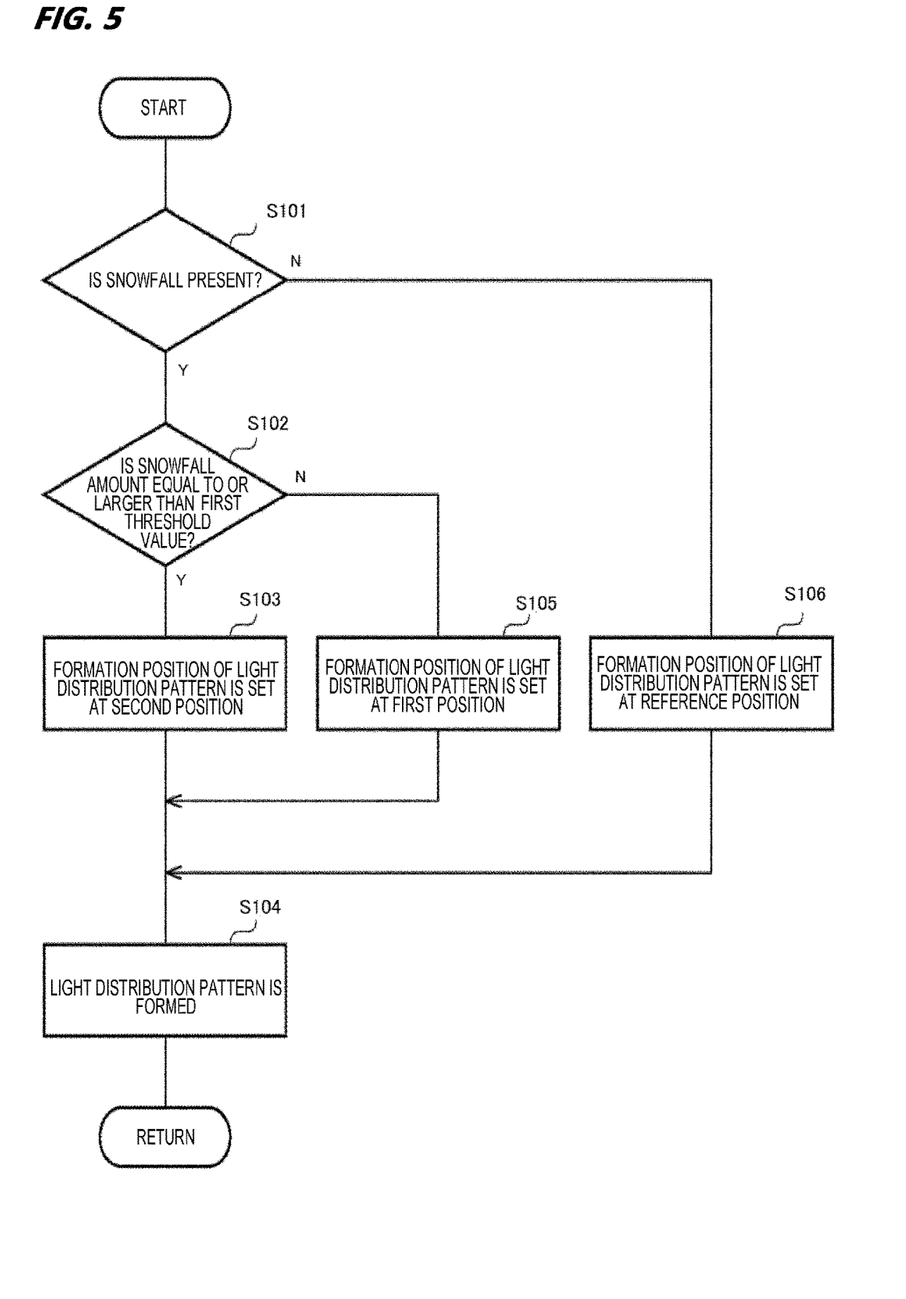
FIG. 5 is a flowchart illustrating an example of a leveling control executed by the vehicle lamp control device according to the first embodiment.

FIG. 5 is a flowchart illustrating an example of a leveling control executed by the vehicle lamp control device according to the first embodiment. In this flow, an execution instruction of the leveling control is issued by, for example, the light switch 304. The flow is repeatedly executed at a predetermined timing by the controller 104 when an ignition is ON. When the execution instruction of the leveling control is canceled (or a stop instruction is issued), or when the ignition is OFF, the flow is ended.

The controller 104 determines the presence of snowfall based on the second threshold value (S101). When it is determined that it is snowing ("Y" in S101), the controller 104 determines whether the snowfall amount is equal to or larger than the first threshold value (S102). When it is determined that the snow amount is equal to or larger than the first threshold value ("Y" in S102), since the snowfall amount is the second amount which is relatively large, the controller 104 sets the formation position of the light distribution pattern P at the second position (S103). Then, the controller 104 transmits an adjustment signal to the leveling actuator 226 so as to form the light distribution pattern P (S104) at the second position, and the routine is ended.

When it is determined that the snow amount is smaller than the first threshold value ("N" in S102), since the snowfall amount is the first amount which is relatively small, the controller 104 sets the formation position of the light distribution pattern P at the first position (S105). Then, the controller 14 transmits an adjustment signal to the leveling actuator 226 so as to form the light distribution pattern P (S104) at the first position, and the routine is ended.

When it is determined that it is not snowing ("N" in S101), the controller 104 sets the formation position of the light distribution pattern P at the reference position S106). Then, the controller 14 transmits an adjustment signal to the leveling actuator 226 so as to form the light distribution pattern P (S104) at the reference position, and the routine is ended.

As described above, the lamp control ECU 100 according to the present embodiment includes the information acquisition unit 102 that acquires snowfall information, and the controller 104 that controls the lamp unit 10 capable of changing the formation position of the light distribution pattern P. The controller 104 controls the lamp unit 10 so as to lower the formation position of the light distribution pattern P from the predetermined reference position when snowfall is perceived. When the snowfall amount is relatively large (e.g., larger than a predetermined amount), the controller 104 substantially lowers the formation position of the light distribution pattern P as compared with the formation position when the snowfall amount is relatively small (e.g., smaller than the predetermined amount).

In this manner, by lowering the formation position of the light distribution pattern P during snowfall, the amount of light reflected by the snow may be decreased. Therefore, it is possible to suppress a glare that is given to a driver due to the reflection. Further, as the snowfall amount increases, the amount of light reflected by the snow increases. In this regard, it is possible to suppress the increasing of the reflection amount of the light due to the snow by displacing the formation position of the light distribution pattern P further downwardly as the snowfall amount increases. Therefore, it is possible to suppress the deterioration of visibility of the driver during snowfall. As a result, the driving safety may be improved.

The first lowering amount D1 and the second lowering amount D2 may be properly set based on experiments or simulations by a system designer with taking account of, for example, improving the visibility of the driver obtained by reducing the reflection due to the snow, and a balance with deterioration of the visibility of the driver caused by lowering the light distribution pattern. Further, when the snowfall amount decreases to the first amount in a situation where the light distribution pattern P is formed at the second position, the controller 104 may raise the light distribution pattern P from the second position to the first position without passing through the reference position. On the contrary, when the snowfall amount increases to the second amount in a situation where the light distribution pattern P is formed at the first position, the controller 104 may lower the light distribution pattern P from the first position to the second position without passing through the reference position. Further, the present disclosure is not limited to the configuration in which the division of the snowfall amount is divided into the first amount and the second amount. The division may be divided into three or more so that the formation position of the light distribution pattern P may be displaced in more multiple stages than two according to the snowfall amount.

Further, in the present embodiment, an upper edge portion of the light distribution pattern P is displaced downwardly by lowering the optical axis of the lamp unit 10 by driving the leveling actuator 226. In a case where the lamp unit 10 is constituted by the DMD, the upper edge portion of the light distribution pattern P may be displaced downwardly by changing a range of a mirror element that reflects light to the front of the own vehicle. Further, in a case where the lamp unit 10 is constituted by a scanning optical system, the upper edge portion of the light distribution pattern P may be displaced downwardly by changing a range of an area scanned by the light of the lamp unit 10. Further, in a case where the lamp unit 10 is constituted by an LED array, the upper edge portion of the light distribution pattern P may be displaced downwardly by changing a range of the LED that is turned ON.

(Second Embodiment)

A lamp control ECU 100 according to a second embodiment is substantially in common in the configuration of the lamp control ECU 100 according to the first embodiment, except that the formation position of the light distribution pattern P is displaced according to a vehicle speed. Hereinafter, the lamp control ECU 100 according to the second embodiment will be described mainly regarding configurations different from the first embodiment, and common configurations will be either briefly described, or descriptions will be omitted.

Figure 6:
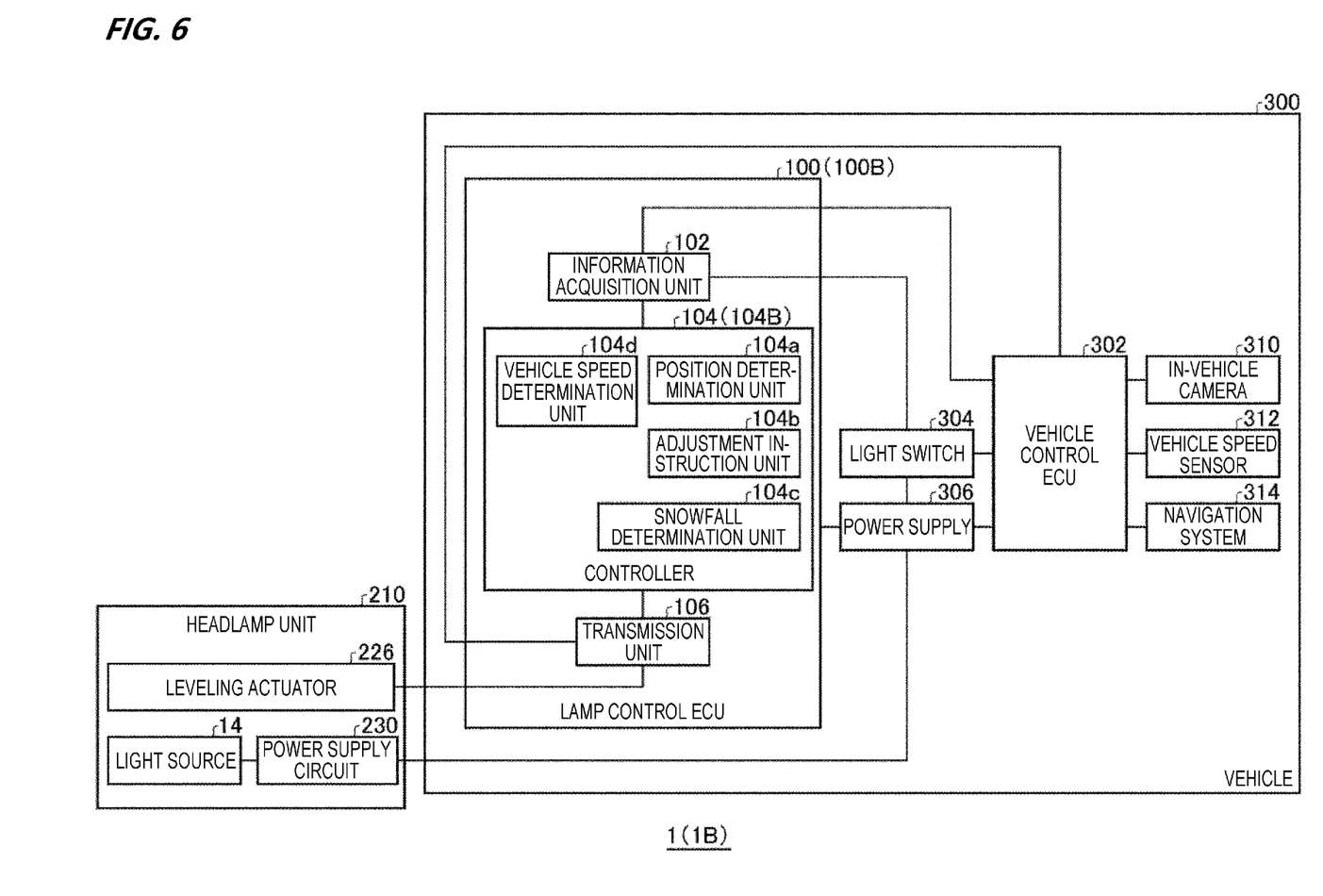
FIG. 6 is a view illustrating a schematic configuration of a vehicle lamp system according to a second embodiment.

FIG. 6 is a view illustrating a schematic configuration of a vehicle lamp system according to the second embodiment. A vehicle lamp system 1(1B) includes the headlamp unit 210 having the lamp unit 10 serving as a vehicle lamp, a lamp control ECU 100 (100B) serving as a control device for the vehicle lamp, an in-vehicle camera 310 and a navigation system 314 serving as a snowfall detection device, a vehicle control ECU 302, a light switch 304, a power supply 306 and a vehicle speed sensor 312, as main components. The structure of the headlamp unit 210 is similar to the one as illustrated in FIG. 1.

The lamp control ECU 100 includes an information acquisition unit 102, a controller 104 (104B), and a transmission unit 106. The information acquisition unit 102 receives signals output from, for example, the in-vehicle camera 310, a vehicle speed sensor 312, and the navigation system 314 via the vehicle control ECU 302. The signal received by the information acquisition unit 102 is transmitted to the controller 104. The controller 104 executes the leveling control that displaces the posture of the lamp unit 10. The controller 104 includes the position determination unit 104a, the adjustment instruction unit 104b, the snowfall determination unit 104c, and a vehicle speed determination unit 104d.

The controller 104 executes the leveling control that displaces the posture of the lamp unit 10 according to the snowfall. Specifically, the controller 104 controls the lamp unit 10 so as to lower the formation position of the light distribution pattern P from a predetermined reference position when snowfall is perceived. Further, in a situation where it is snowing, when a vehicle speed of the own vehicle is relatively fast (e.g., faster than a predetermined speed), the controller 104 substantially lowers the formation position of light distribution pattern P as compared with the formation position when the vehicle speed is relatively slow (e.g., slower than a predetermined speed).

The controller 104 determines the presence of snowfall by the snowfall determination unit 104c, determines the vehicle speed of the own vehicle by the vehicle speed determination unit 104d, determines the formation position of the light distribution pattern by the position determination unit 104a, and determines the pitch angle to be taken by the lamp unit 10 by the adjustment instruction unit 104b so as to drive the leveling actuator 226. Detailed descriptions will be provided in the below.

The snowfall determination unit 104c determines the presence of snowfall in the running environment of the own vehicle based on the snowfall information obtained from the snowfall detection device. As a snowfall detection device, the in-vehicle camera 310 or the navigation system 314 may be used. A signal indicating the snowfall information is acquired by the information acquisition unit 102 and transmitted to the controller 104. For example, the snowfall determination unit 104c has a predetermined second threshold value regarding the presence of the snowfall amount. Then, when the snowfall amount is smaller than the second threshold value, the snowfall determination unit 104c determines that there is no snowfall. Further, when the snowfall amount is equal to or larger than the second threshold value, the snowfall determination unit 104c determines that there is snowfall. A signal indicating the determination result of the snowfall determination unit 104c is sent to the position determination unit 104a.

The vehicle speed determination unit 104d determines whether the vehicle speed of the own vehicle is a first speed that is relatively slow or a second speed that is relatively fast, based on the vehicle speed information acquired from the vehicle speed sensor 312. For example, the vehicle speed determination unit 104d has a predetermined third threshold value regarding the vehicle speed. When the vehicle speed is smaller than the third threshold value, the vehicle speed is defined as a predetermined first speed. Further, when the vehicle speed is equal to or larger than the third threshold value, the vehicle speed is defined as a predetermined second speed. The third threshold value may be properly set based on experiments and simulations by a designer. A signal indicating the determination result of the vehicle speed determination unit 104d is sent to the position determination unit 104a.

The position determination unit 104a determines a position where a light distribution pattern P should be formed by using the information acquired from the snowfall determination unit 104c and the vehicle speed determination unit 104d. First, in a situation where it is not snowing, the position determination unit 104a determines the formation position of the light distribution pattern P as a predetermined reference position as illustrated in FIG. 4A.

Further, in a situation where it is snowing, the position determination unit 104a lowers the formation position of the light distribution pattern P from the reference position as illustrated in FIGS. 4B and 4C. In addition, as illustrated in FIG. 4B, when the vehicle speed is the predetermined first speed during snowfall, the position determination unit 104a sets the formation position of the light distribution pattern P at a first position which is lowered from the reference position by a predetermined first lowering amount D1.

In the meantime, as illustrated in FIG. 4C, when the vehicle speed is the predetermined second speed which is faster than the first speed, the position determination unit 104a sets the formation position of the light distribution pattern P at a second position which is lowered from the reference position by a predetermined second lowering amount D2 which is larger than the first lowering amount D1. That is, the position determination unit 104a displaces a position of a geometric center of gravity of the light distribution pattern PL further downwardly as the vehicle speed increases. In the case of the low-beam light distribution pattern PL, the positions of the cutoff lines CL1 to CL3 are displaced downwardly.

For example, the position determination unit 104a stores in a memory a conversion table in which the vehicle speed and the formation position of the light distribution pattern P are associated with each other in advance. Then, in a situation where it is snowing, by using the conversion table, the formation position of the light distribution pattern P is set from the determination result of the vehicle speed determination unit 104*d*.

The adjustment instruction unit 104*b* sets the pitch angle to be taken by the lamp unit 10 based on the formation position of the light distribution pattern P set by the position determination unit 104*a*. The adjustment instruction unit 104*b* generates an adjustment signal that instructs to adjust the pitch angle of the lamp unit 10, and outputs the signal to the leveling actuator 226 via the transmission unit 106. The leveling actuator 226 is driven based on the received adjustment signal. Therefore, the pitch angle of the lamp unit 10 is adjusted.

Figure 7:
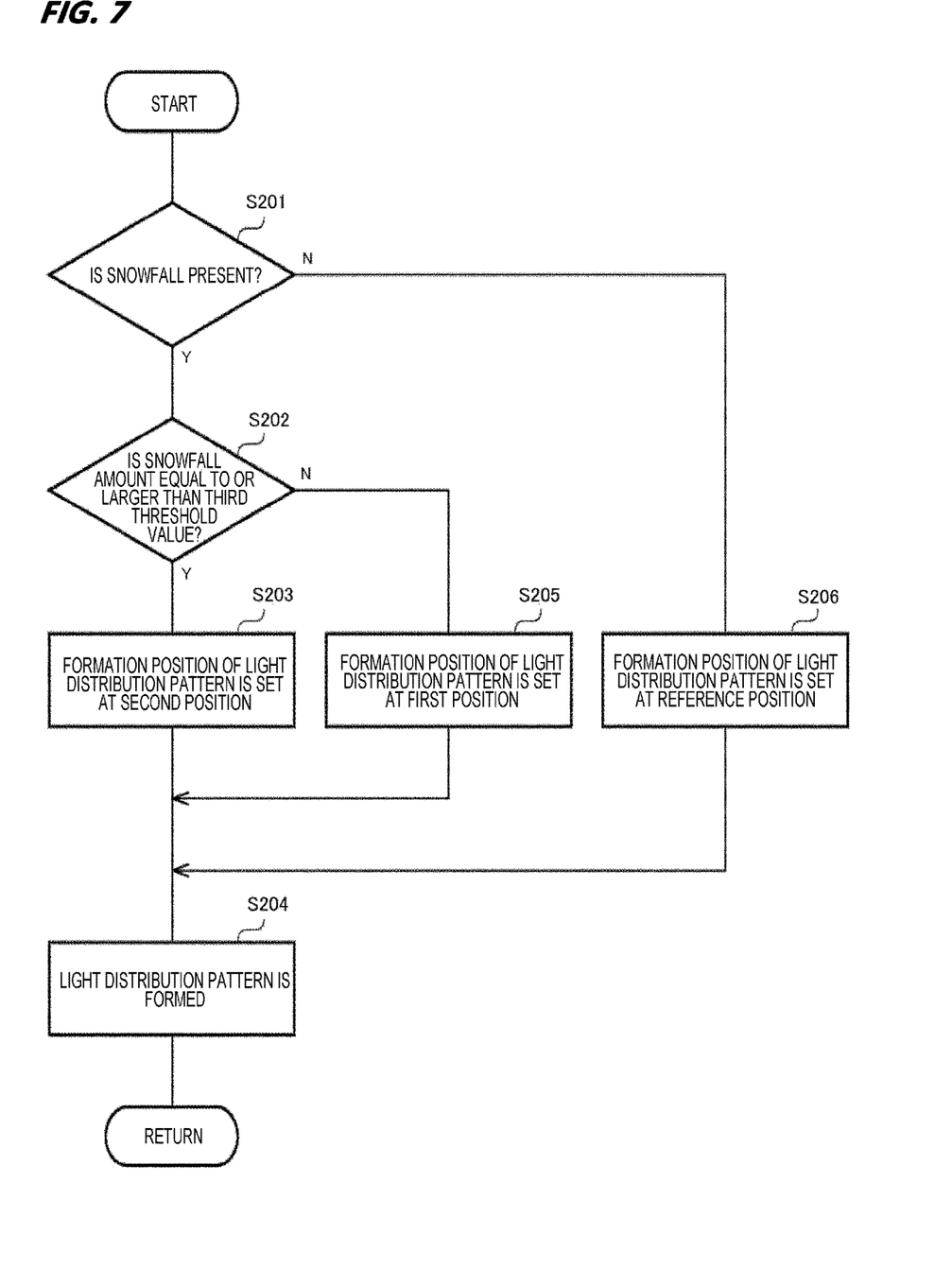
FIG. 7 is a flowchart illustrating an example of a leveling control executed by the vehicle lamp control device according to the second embodiment.

FIG. 7 is a flowchart illustrating an example of a leveling control executed by the vehicle lamp control device according to the second embodiment. An executing timing of the flow is the same as that of the first embodiment.

The controller 104 determines the presence of snowfall based on the second threshold value (S201). When it is determined that it is snowing ("Y" in S201), the controller 104 determines whether the vehicle speed is equal to or larger than the third threshold value (S202). When it is determined that the vehicle speed is equal to or larger than the third threshold value ("Y" in S202), since the vehicle speed is the second speed which is relatively fast, the controller 104 sets the formation position of the light distribution pattern P at the second position (S203). Then, the controller 104 transmits an adjustment signal to the leveling actuator 226 so as to form the light distribution pattern P (S204) at the second position, and the routine is ended.

When it is determined that the vehicle speed is smaller than the third threshold value ("N" in S202), since the vehicle speed is the first speed which is relatively slow, the controller 104 sets the formation position of the light distribution pattern P at the first position (S205). Then, the controller 14 transmits an adjustment signal to the leveling actuator 226 so as to form the light distribution pattern P (S204) at the first position, and the routine is ended.

When it is determined that it is not snowing ("N" in S201), the controller 104 sets the formation position of the light distribution pattern P at the reference position S206). Then, the controller 14 transmits an adjustment signal to the leveling actuator 226 so as to form the light distribution pattern P (S204) at the reference position, and the routine is ended.

As described above, the lamp control ECU 100 according to the present embodiment includes the information acquisition unit 102 that acquires snowfall information, and the controller 104 that controls the lamp unit 10 capable of changing the formation position of the light distribution pattern P. The controller 104 controls the lamp unit 10 so as to lower the formation position of the light distribution pattern P from the predetermined reference position when snowfall is perceived. When the vehicle speed is relatively fast (e.g., faster than a predetermined value), the controller 104 substantially lowers the formation position of the light distribution pattern P as compared with the formation position when the vehicle speed is relatively slow (e.g., slower than the predetermined value).

In this manner, by lowering the formation position of the light distribution pattern P during snowfall, an amount of light reflected by the snow may be decreased. Therefore, it is possible to suppress the glare that is given to a driver due to the reflection. Further, as the vehicle speed increases, an apparent snowfall amount increases. As the snowfall amount increases, the amount of light reflected by the snow increases. In this regard, it is possible to suppress the deterioration of the visibility of the driver during snowfall by displacing the formation position of the light distribution pattern P further downwardly as the vehicle speed increases. As a result, the driving safety may be improved.

The first lowering amount D1 and the second lowering amount D2 may be properly set based on experiments and simulations by a system designer. Further, when the vehicle speed is decreased to the first speed in a situation where the light distribution pattern P is formed at the second position, the controller 104 may raise the light distribution pattern P from the second position to the first position without passing through the reference position. On the contrary, when the vehicle speed is increased to the second speed in a situation where the light distribution pattern P is formed at the first position, the controller 104 may lower the light distribution pattern P from the first position to the second position without passing through the reference position. Further, the present disclosure is not limited to the configuration in which the division of the vehicle speed is divided into the first speed and the second speed. The division may be divided into three or more so that the formation position of the light distribution pattern P may be displaced in more multiple stages than two according to the vehicle speed.

Further, in the present embodiment, an upper edge portion of the light distribution pattern P is displaced downwardly by lowering the optical axis of the lamp unit 10 by driving the leveling actuator 226. In a case where the lamp unit 10 is constituted by a scanning optical system or an LED array, the upper edge portion of the light distribution pattern P may be displaced downwardly by changing a range of a mirror element used, a range of an area scanned, or a range of the LED to turned ON/OFF.

The controller 104 may combine the control in the first embodiment and the control in the second embodiment. That is, the controller 104 may change the formation position based on the snowfall amount as well as the vehicle speed. As a result, the driving safety may further be improved. For example, even in the same snowfall amount, when a vehicle speed of the own vehicle is relatively fast (e.g., faster than a predetermined value), the controller 104 may substantially lower the formation position of the light distribution pattern P as compared with the formation position when the vehicle speed is relatively slow (e.g., slower than the predetermined value). Specifically, in the case where the snowfall amount is the first amount, when the vehicle speed is the second speed, the formation position of the light distribution pattern P is lowered as compared to the formation position when the vehicle speed is the first speed. It is also applied to the case where the snowfall amount is the second amount. In cases where the snowfall amount is the first amount and the vehicle speed is the second speed, and the snowfall amount is the second amount and the vehicle speed is the first speed, it is possible to properly set a case in which the lowering amount of the formation position of the light distribution pattern P becomes larger, depending on which of the snowfall amount or the vehicle speed is focused on.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A controller for a vehicle lamp comprising:
a memory; and
a processor coupled to the memory and configured to:
receive snowfall information from a snowfall detector, the snowfall information indicating a presence of snowfall and an amount of snowfall; and
change a formation position of a light distribution pattern of the vehicle lamp so as to downwardly lower the formation position from a predetermined reference position when snowfall is perceived, and when the snowfall amount is larger than a predetermined value, the controller further lowers the formation position downwardly as compared with the formation position when the snowfall amount is smaller than the predetermined value, and
wherein the snowfall detector is one of a camera or a vehicle navigation system.

2. The vehicle lamp control device of claim 1, wherein, when a vehicle speed of an own vehicle is faster than a predetermined value, the controller substantially lowers the formation position as compared with the formation position when the vehicle speed of the own vehicle is slower than the predetermined value, without turning off the vehicle lamp.

3. A vehicle lamp system comprising:
a vehicle lamp capable of changing a formation position of a light distribution pattern;
a snowfall detector; and
the controller according to claim 2.

4. A vehicle lamp system comprising:
a vehicle lamp capable of changing a formation position of a light distribution pattern;
a snowfall detector; and
the controller according to claim 1.

5. A controller for a vehicle lamp comprising:
a memory; and
a processor coupled to the memory and configured to:
receive snowfall information indicating a presence of snowfall and an amount of snowfall; and
change a formation position of a light distribution pattern,
wherein the processor is further configured to control the vehicle lamp so as to downwardly lower the formation position from a predetermined reference position when snowfall is perceived, and when a vehicle speed of an own vehicle is faster than a predetermined value, the controller further lowers the formation position downwardly as compared with the formation position when the vehicle speed of the own vehicle is slower than the predetermined value, without turning off the vehicle lamp.

6. A vehicle lamp system comprising:
a vehicle lamp capable of changing a formation position of a light distribution pattern;
a snowfall detector; and
the controller according to claim 5.

* * * * *